US006987783B2

(12) United States Patent
Fajardo et al.

(10) Patent No.: US 6,987,783 B2
(45) Date of Patent: Jan. 17, 2006

(54) THREE-LEVEL AIR-CLAD RARE-EARTH DOPED FIBER LASER/AMPLIFIER

(75) Inventors: James C. Fajardo, Painted Post, NY (US); Michael T. Gallagher, Corning, NY (US); Anping Liu, Bothell, WA (US); (Ying) Lisa Peng, Big Flats, NY (US); Carlton M. Truesdale, Corning, NY (US); Luis A. Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 80 days.

(21) Appl. No.: 10/741,211

(22) Filed: Dec. 19, 2003

(65) Prior Publication Data

US 2004/0233941 A1 Nov. 25, 2004

Related U.S. Application Data

(63) Continuation-in-part of application No. 09/968,354, filed on Sep. 27, 2001, now Pat. No. 6,751,241.

(51) Int. Cl.
*H01S 3/30* (2006.01)

(52) U.S. Cl. .............................. 372/6; 372/10; 372/25; 372/26

(58) Field of Classification Search ...................... 372/6, 372/10, 25; 385/125
See application file for complete search history.

(56) References Cited

U.S. PATENT DOCUMENTS 5,907,652 A * 5/1999 DiGiovanni et al. ........ 385/125
6,229,939 B1   5/2001 Komine ........................ 385/29

(Continued)

FOREIGN PATENT DOCUMENTS

| EP | 1199582 A1 | 4/2002 |
|----|-----------|--------|
| WO | WO 99/27619 A2 | 6/1999 |
| WO | WO00/16141 | 3/2000 |
| WO | WO00/49435 | 8/2000 |
| WO | WO03/038486 A2 | 5/2003 |

OTHER PUBLICATIONS

Sahu et al. (Jacketed air–clad cladding pumped ytterbium–doped fibre laser with wide tuning range article in Electronics Letters Aug. 30, 2002, vol. 37 No. 18).*

"Novel Fiber Lasers and Applications" Zenteno, et al Mar. 2003 Optics & Photonics News.

"Jacketed air–clad cladding pumped ytterbium–doped fibre laser with wide tuning range" Sahu, et al Electroncis Letters Aug. 30, 2001, vol. 37, No. 18.

*Primary Examiner*—Minsun Oh Harvey
*Assistant Examiner*—Dung (Michael) T. Nguyen
(74) *Attorney, Agent, or Firm*—Juliana Agon

(57) ABSTRACT

An optically-active air-clad fiber (30) includes a core (34, 84) that facilitates doping with an ion optically excitable and having a three-level optical transition when pumped at a first end (28) of an optical cavity (46) by a multimode pump source (72) at a pump wavelength (64) for lasing at a signal wavelength (66) different than the pump wavelength (64) at a second end (29) of the optical cavity (46), the core (34, 84) having a refractive index, wherein the core (34, 84) is transformed from the first end to proximate the second end (29) thereof such that the optically-active fiber (30) is multimode at the pump wavelength proximate to the first end (28), and is single-mode at the signal wavelength proximate to the second end (29). An air-clad (36, 86) surrounds at least one portion of the core (34, 84) and has a lower effective refractive index than the refractive index of the core (34, 84).

19 Claims, 8 Drawing Sheets

U.S. PATENT DOCUMENTS

| | | | |
|---|---|---|---|
| 6,411,762 B1 | 6/2002 | Anthon et al. | 385/123 |
| 6,444,133 B1 | 9/2002 | Fajardo | 216/24 |
| 6,480,659 B1 | 11/2002 | Patlakh et al. | 385/125 |
| 6,563,995 B2 | 5/2003 | Keaton et al. | 385/127 |
| 6,631,234 B1 | 10/2003 | Russell et al. | 385/125 |
| 6,640,037 B2 * | 10/2003 | Gallagher | 385/125 |
| 2002/0031303 A1 * | 3/2002 | Wang | 385/39 |
| 2003/0165313 A1 | 9/2003 | Broeng et al. | 385/125 |
| 2004/0052278 A1 * | 3/2004 | Kane et al. | 372/25 |

* cited by examiner

THREE-LEVEL AIR-CLAD RARE-EARTH DOPED FIBER LASER/AMPLIFIER

CLAIM OF PRIORITY

This application is a continuation-in-part of and claims the benefit from U.S. patent application Ser. No. 09/968,354 filed Sep. 27, 2001, now U.S. Pat. No. 6,751,241, which is incorporated herein.

BACKGROUND OF THE INVENTION

1. Field of the Invention

The present invention relates generally to microstructures, such as air-clad fibers, and in particular to an air-clad embodiment for a 3-level fiber laser.

2. Technical Background

It is known that for efficient coupling into a single-mode fiber, a pump source doped fiber should also be single-mode. However, multimode broad-area diode laser remains the most power efficient and least expensive pump source for optically pumping the doped fiber. Recent progress in semiconductor laser technology has led to creation of broad-area laser diodes with output powers of up to 16 W. Devices 100 μm wide with a slow-axis numerical aperture (NA) of less than 0.1 and output power of 4 Watts at 920 and 980 nm are now passing qualification testing for telecommunication applications. With proper coupling optics 70, the beam of such a laser diode can be focused into a spot as small as 30×5 μm with an NA of less than 0.35 in both transverse directions. The optical power density in such a spot is ~1.3 MW/cm$^2$, which should be high enough to achieve transparency in 3-level laser systems.

Brightness conversion is also known. One approach for brightness conversion utilizes inexpensive high-power broad-area pump lasers optically pumping cladding-pumped, or double-clad fiber designs to provide a high powered optical pump fiber laser. The advantages of cladding-pumped fiber lasers are well known. Such a device effectively serves as a brightness converter, converting a significant part of the multimode pump light into a single-mode output at a longer wavelength.

Cladding pumping can be employed to build a high-power single-mode fiber pump laser. A source based on the pure three-level 978 nm Yb$^{+3}$ transition has long been suggested as a pump for known erbium doped fiber amplifiers (EDFAs) because this wavelength is close to the desired pumping wavelength of 980 nm. However, the cladding-pumped technique has been determined in practice to be ineffective for pumping pure three-level fiber lasers, such as the 980 nm transition of ytterbium, because of various fiber laser design parameters that have to be satisfied. A fiber amplifier is just a laser without a cavity for reflecting light back and forth that is required for lasing.

Practical double-clad amplifiers and lasers have been mostly limited to 4-level systems. Double-clad fiber lasers offer better performance for four-level lasing (where the lasing occurs in a transition between two excited states) than for the three-level one (where the lasing transition is between the excited and the ground state). For example, for the rare-earth ion, Ytterbium (Yb), the three-level transition is at 978 nm and competing higher-gain four-level transition is at about 1030–1100 nm.

In a double-clad laser, an outer cladding confines the pump light from a primary pump source in a large cross-sectional area multimode inner cladding. The much smaller cross-sectional area core is typically doped with at least one rare-earth ion, for example, neodymium or ytterbium, to provide lasing capability in a single-mode output signal. Typically, a neodymium-doped or ytterbium-doped double-clad fiber is pumped with one or several high-power broad-area diode lasers (at 800 nm or 915 nm) to produce a single transverse mode output (at the neodymium four-level transition of 1060 nm or the ytterbium four level transition of 1030–1120 nm, respectively). Thus, conventional double-clad arrangements facilitate pumping of the fiber using a multimode first cladding for accepting and transferring pump energy to a core along the length of the device. The double-clad laser output can be used to pump a cascaded Raman laser to convert the wavelength to around 1480 nm, which is suitable for pumping erbium.

How much pump light can be coupled into a double-clad fiber inner cladding depends on the cladding size and NA. As is known, the "etendue" (numerical aperture multiplied by the aperture dimension or spot size) of the fiber should be equal to or greater than the etendue of the pump source for efficient coupling. The numerical aperture and spot size may be different in both axes so there may be an etendue in the x and y directions that must be maintained or exceeded.

Typically, a high numerical aperture NA$_{clad}$, related to the difference in refractive index between the first and second cladding is desired. If there are two claddings instead of one, the index of the first cladding is n$_{clad,1}$ and the index of the second cladding is n$_{clad,2}$ such that NA$_{clad}$=(n$_{clad,1}^2$-n$_{clad,2}^2$)$^{1/2}$. In the well-known design, the first clad layer is made of glass and the second is made of plastic (fluorinated polymer) with a relatively low refractive index in order to increase the numerical aperture NA$_{clad}$. Such plastic may not have the desired thermal stability for many applications, may delaminate from the first cladding, and may be susceptible to moisture damage.

In known double-clad host fibers, the laser cavity is formed by an input dielectric mirror which transmits the 920-nm pump band and reflects the desired 980-nm lasing band. For any input mirror of the fiber laser, it is a desire to reflect only the fundamental mode, at the laser wavelength, e.g., 978 nm, to form the input end of the optical cavity. A dielectric mirror at the end of the double-clad fiber or a weak fiber Bragg grating in the single-mode fiber, e.g., Corning® CS-980 fiber, coupled to the coupling end of the double-clad fiber serves as the output coupler for providing the output end of the cavity.

One of the primary technical challenges in a high power fiber laser is the formation of the input dielectric mirror across the multimode inner cladding of the double-clad fiber. Approaches include attaching a glass micro-sheet to the fiber endface or directly depositing a thin-film dielectric on the fiber endface, but both of these methods present their own technical hurdles.

A two-stage fiber laser has also been proposed as an alternate optical pump. This two-stage laser has an optical pump source to provide a pump light at a pump wavelength. A first waveguide portion which when optically pumped at the pump wavelength is capable of lasing with an emission at a lasing wavelength. The first waveguide portion exhibits multi-transverse-mode behavior at the lasing wavelength. A second waveguide portion exhibiting a substantially single transverse mode behavior at the lasing wavelength is optically coupled together with the first waveguide portion. An optical cavity is defined by a multimode grating on the first waveguide portion and a single-mode grating on the second waveguide portion and includes the first and second waveguide portions. The delta index or contrast index of the difference between the cladding refractive index and the multimode core refractive index is between 0.04 to 0.06 for the low indexed germania (Ge) doped silicate multimode fibers of this approach.

As is known, the terminology "fiber Bragg grating" refers to a grating in which incident light is reflected back along the same fiber by a "short period" (a.k.a. Bragg) grating in the fiber and the fabrication of gratings is known. Fiber Bragg gratings (FBGs) couple power from one mode to another provided that the propagation constants of the two modes satisfy the following grating equation:

$$\beta_1 - \beta_2 = \frac{2\pi}{\Lambda} \qquad \text{Eq. (1)}$$

where $\beta_1$ and $\beta_2$ are the propagation constants of the two modes, $\Lambda$ is the grating period in the fiber, and first order diffraction is assumed for simplicity. When a forward propagating mode reflects into the identical backwards propagating mode, the Bragg condition becomes $\lambda_B = 2n_{eff}\Lambda$, where $n_{eff}$ is the effective index of the mode ($\beta = (2\pi/\lambda)n_{eff}$) and lies between the core index $n_{core}$ and the cladding index, $n_{clad}$ for guided modes ($n_{clad} < n_{eff} < n_{core}$). Forward propagating modes may also reflect into other modes when mode orthogonality is no longer maintained, for example when UV induced index changes due to the FBG itself perturb the index profile sufficiently. The index profile needed depends on fiber geometry, cladding material, and the exact wavelengths for the particular application.

As with the double-clad fiber laser, to enable the maximum launch of optical power from the high power pump source into the laser cavity of either the double-clad fiber or the two-stage multimode to single-mode fiber laser, the optical cavity needs to have a large numerical aperture (NA) which is related to the index contrast. However, an increased index delta for proving power enhancement requires more design, testing, and manufacturing complexities to be first solved.

Air-clad fibers are known. But to date, a mass-manufacturable air-clad three-level lasing fiber laser is not known.

Therefore there is a continued need to increase the power output of a fiber laser, whether double-clad or two-staged, while increasing the reliability and simplifying the packaging and manufacturing of the fiber laser, which will also reduce the cost of the fiber laser.

SUMMARY OF THE INVENTION

In an embodiment of the invention, an optically-active air-clad fiber includes a core that facilitates doping with an ion optically excitable and having a three-level optical transition when pumped at a first end of an optical cavity by a multimode pump source at a pump wavelength for lasing at a signal wavelength different than the pump wavelength at a second end of the optical cavity, the core having a refractive index, wherein the core is transformed from the first end to proximate the second end thereof such that the optically-active fiber is multimode at the pump wavelength proximate to the first end, and is single-mode at the signal wavelength proximate to the second end. An air-clad surrounds at least one portion of the core and has a lower effective refractive index than the refractive index of the core.

The invention is particularly advantageous when used as a pump source for an erbium-doped fiber amplifier (EDFA) or for the EDFA itself, such as may be found in single-mode fiber optic communication systems or networks.

DETAILED DESCRIPTION OF THE PREFERRED EMBODIMENTS

Figure 1:
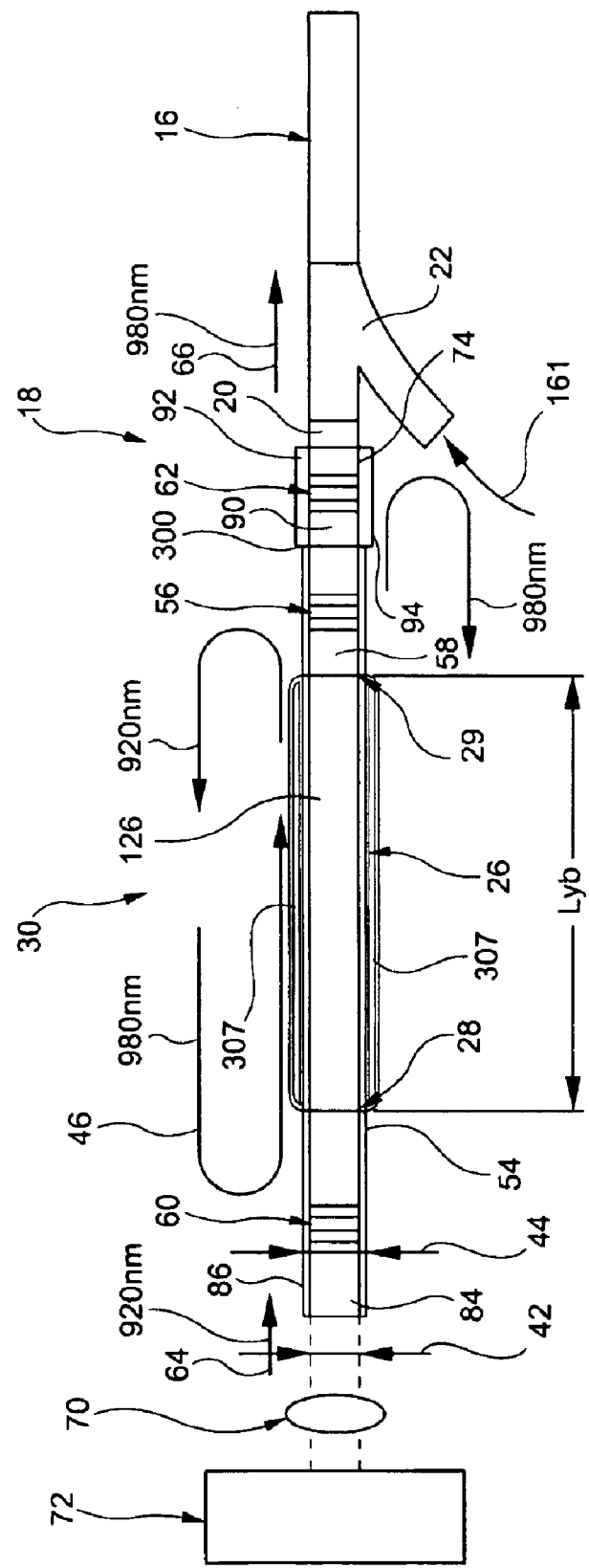
FIG. 1 is a longitudinal schematic view of an optically-active air-clad fiber 30 used as a pump, according to the present invention.
Figure 6:
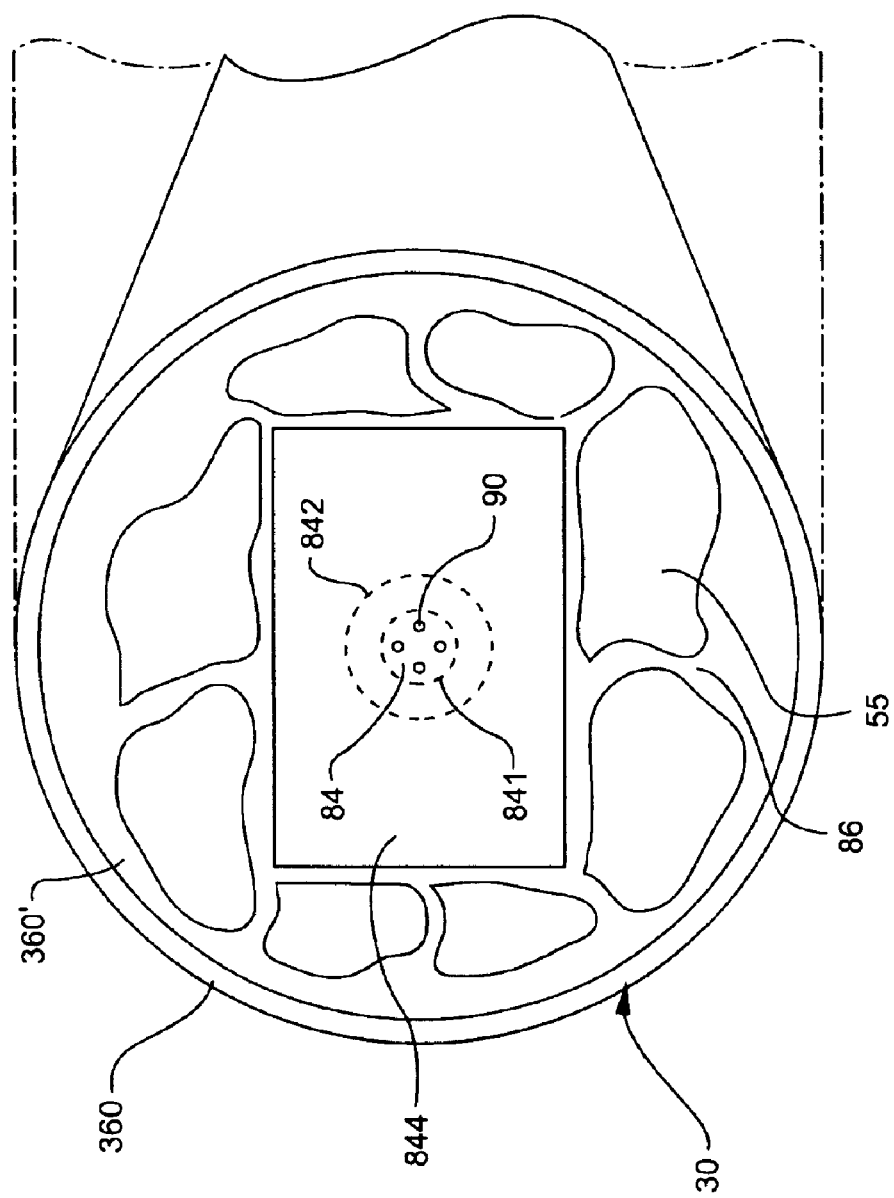
FIG. 6 is a cross-sectional perspective simplification of an optically-active air-clad fiber 30, of FIG. 1, according to the present invention.

The optically-active fiber or waveguide for possible use as a fiber laser, or other optic structure of the present invention is shown in FIGS. 1 and 6 and is generally described and depicted herein with reference to several exemplary or representative embodiments with the same numbers referenced to the same or functionally similar parts. In general, different design considerations need to be traded-off to provide a high-powered three-level transition fiber laser that can be embodied in different ways.

Referring to FIG. 6, an air-clad fiber optic structure or apparatus 30 includes a guidance region 84 containing an actively doped gain portion 90. An air-clad region 86 surrounds the guidance region 84 and has a lower effective refractive index than the refractive index of the guidance region for the actively doped gain portion 90 to transition efficiently at a high three-level optical transition.

As one possible embodiment of the fundamental mode guidance region, a solid silica core 842 can be surrounded by a solid silica inner-cladding 844 surrounding the solid silica core 842, wherein the solid silica core has an oscillation suppression portion to suppress oscillation in transitions that can be inverted with lower gain at longer to serve as a fundamental mode cut-off wavelength region wherein the wavelength point at which transmission of the fundamental mode is in a range about 3 dB–10 dB below maximum.

Figure 3:
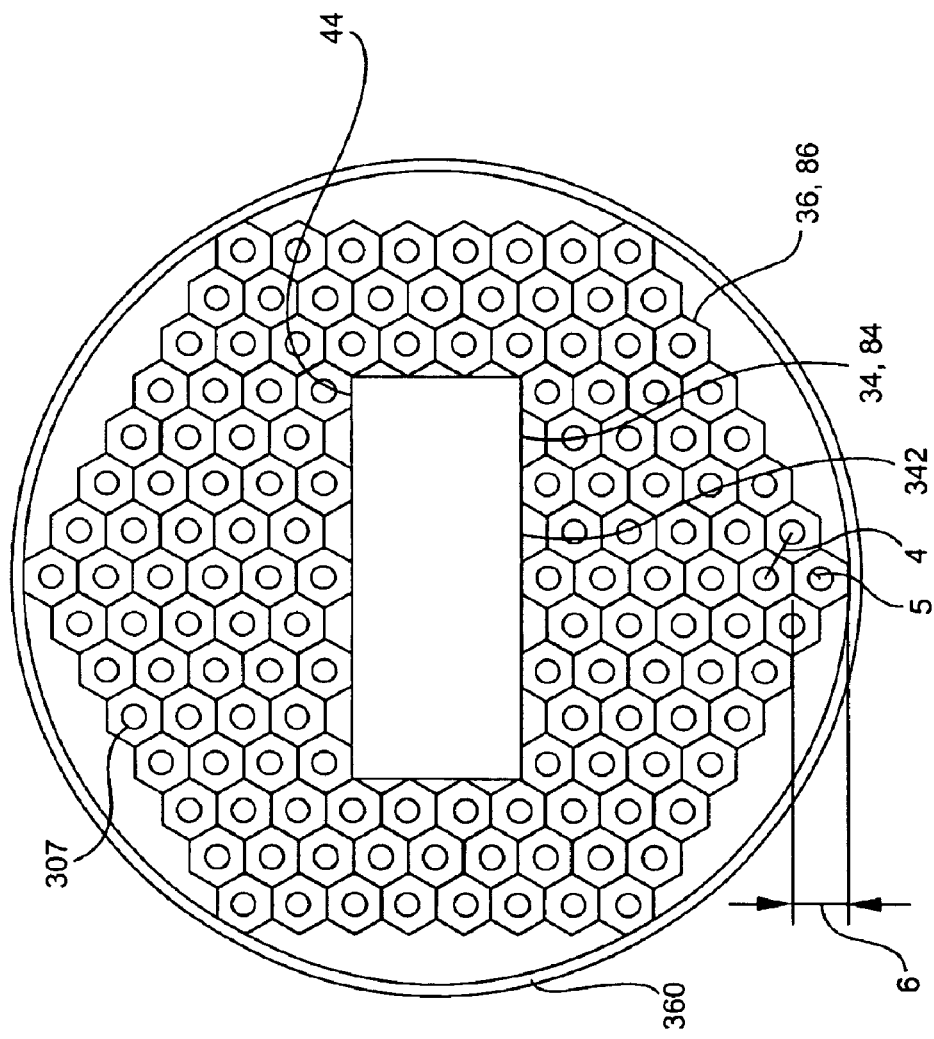
FIG. 3 is a cross-section illustration of the multimode portion of the active fiber 30 of FIG. 1 or 2, proximate the first end, according to the present invention.

A silica tube acts as a jacket 360 to hold the original capillary close-packed stacks of smaller tubes (as seen in FIG. 3) to form the air holes in the fused silica material but could also serve as another solid outer cladding 360'. Alternatively, a polymer coating could be used to protect the air-clad as the jacket 360, with or without the solid outer cladding 360'. The solid outer cladding 360' is used to enhance fiber strength and to enable the structure 30 to be spliced. The material of the solid-outer cladding 360' is the same or similar to the material of the solid pump cladding 844 to simplify perform and fiberization processes. Polymer coating 360 provides protection of the structure from damage and has a diameter typically in the range of about 250–600 microns to encapsulate a glass fiber diameter of about 125 microns.

As shown by hashed lines, the solid silica core 842 can be as small as the size of a single-mode core 841 or to increase in size to have two or more modes or even larger to become multimode. Preferably, the core diameter 42 is in a range about 4–20 microns. In this manner, a hybrid holey double-clad combination is formed where the second cladding is the air-clad 86 surrounding a resultant effective multimode core 84. This effective multimode core 84 is then made-up of the single or multimode core 842 and the inner cladding 844 surrounding the core 842.

Referring to FIGS. 1 and 6, the pump light from the laser diode 72 is coupled into the pump cladding 844 and gradually absorbed by the rare earth doped 90 core 841 during propagation guided by total internal reflection (TIR) at the surface between the pump cladding 844 and the one to ten layers of air-holes 55 having a total width of about 10–50 microns. Theoretically, this structure provides the pump cladding 844 with a numerical aperture (NA) that approaches one.

To allow pump light propagating in the pump cladding 844 to be efficiently absorbed in the core 841, the cross-section of the pump cladding 844 can be any elongated shape, for instance, polygon, flower-like, diamond-like, rectangular or elliptical. Preferably, the pump cladding area 844 is 3–100 times larger than the core area 841.

Figure 8:
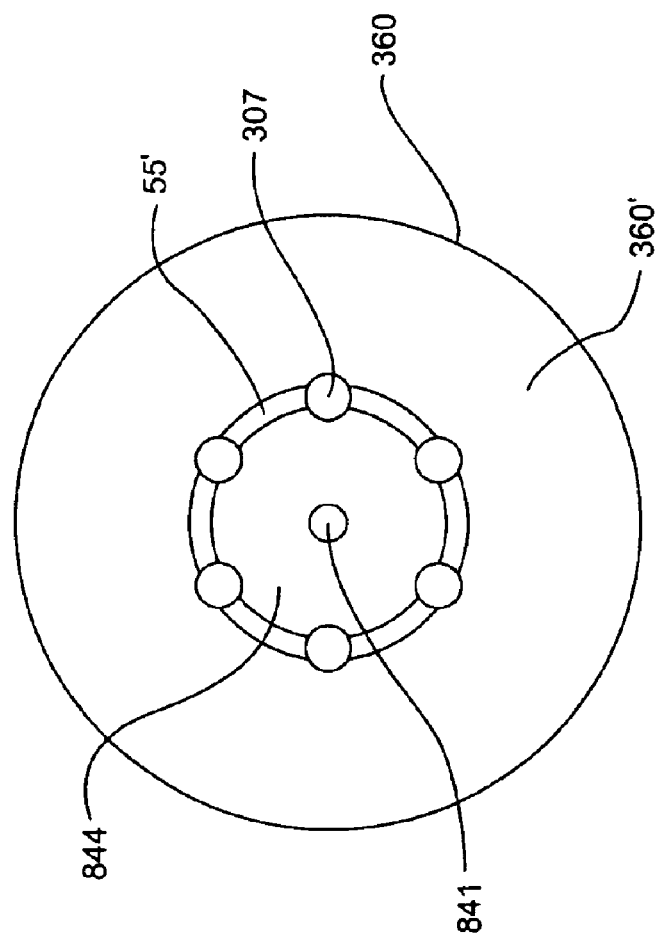
FIG. 8 is a representation of a possible hole distribution of the air-clad 86 of FIG. 6, according to the present invention.

Referring to FIG. 8, a flower-like hole distribution of the air-clad region 86 is represented in the formation of a suitable perform for the fiber as another example of how low refractive index layers can surround the solid pump cladding 844. The approximately curvilinear air gap line 55' is provided by the insertion of several glass tubes or capillaries 307 placed between the solid inner cladding 844 and the solid outer cladding 360'. To reduce remaining stress in the fiber thus formed after fiberization, the tube 307, pump cladding 844, and outer cladding 360' are made of the same doped or undoped silica glass material. Preferably, the diameter of the tube 307 is about one to five times larger than the doped core 841 to efficiently modify the circular surface of the pump cladding 844 into a flower-like shape, in order to improve absorption efficiency of the doped core 841. The number of tubes can vary and could be of any other shapes.

Air-holes 55 distributed around the pump cladding 844 increases the numerical aperture (NA) of the pump cladding 844. The average refractive index of the air layers is determined by the ratio of total glass wall area to the total air area which is related to a void-filling fraction (Eq. 5) where the holes need not all be the same. The thinner the wall, the lower the effective index. Considering current process difficulty, the area ratio of wall to air of hole 55 is less than about 0.3. The cross-section of the hole 55 may start as a circle, triangle, rectangle, square, hexagon or any other regular or irregular shape and preferably stacked as a hexagon, as shown in FIG. 3 for a closer-packed arrangement to increase the hole size.

Figure 7:
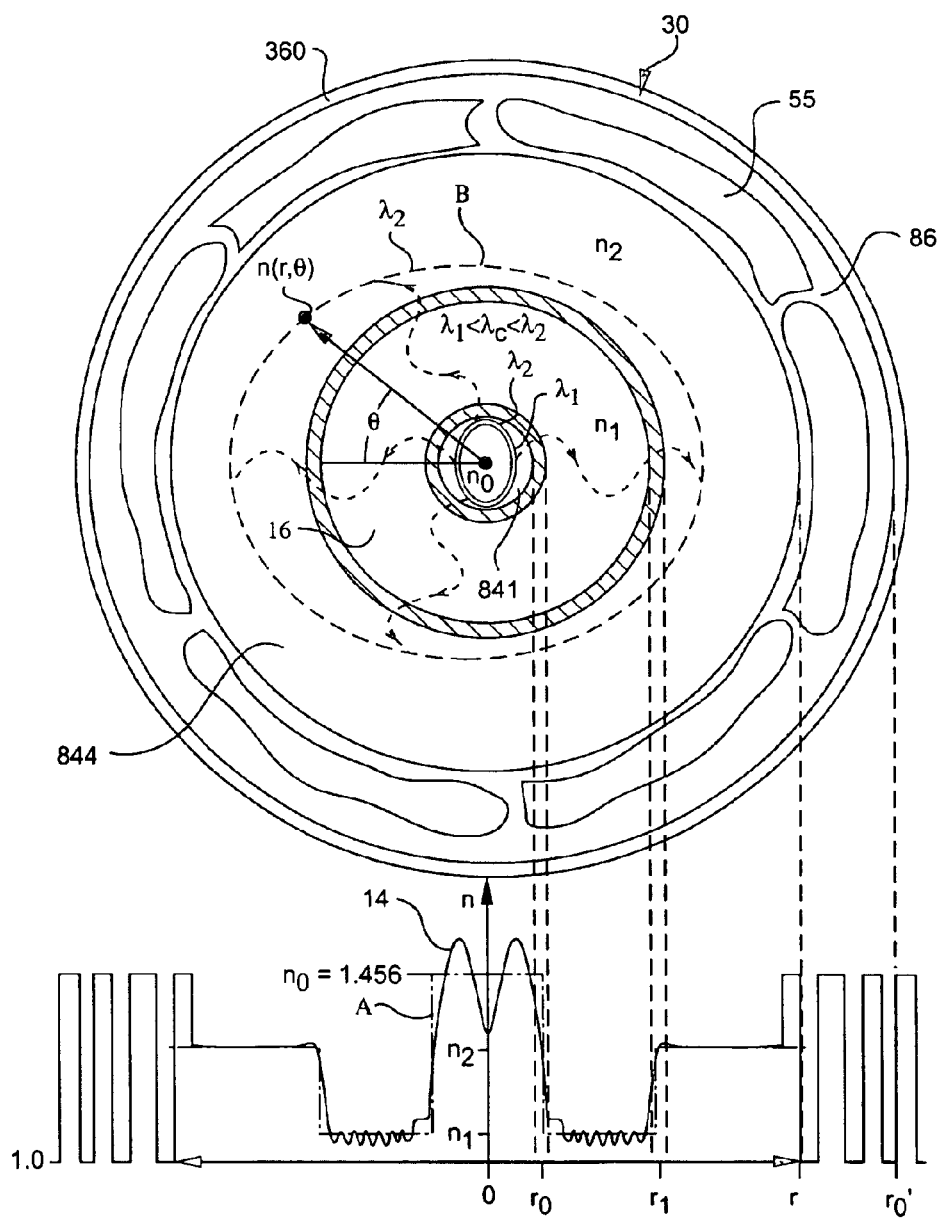
FIG. 7 is a index profile of the cross-sectional representation of the fiber 30 of FIG. 6, including a depressed cladding, according to the present invention.

Referring to FIG. 7, the inner solid cladding 844 of FIG. 6 can optionally include a depressed cladding portion 16 as the oscillation suppression portion, wherein losses are added in transitions that can be inverted with lower gain at longer wavelengths such that a refractive index profile A that results from the core has a fundamental transverse mode having a long cut-off wavelength λc.

Depressed claddings are already known but they will be best understood by first reviewing some construction and engineering principles with reference to FIG. 7. The cross-sectional view of this drawing illustrates the fiber-optic structure 30 in the form of an optical fiber having the core 841 exhibiting a generally cylindrical core cross-section. The cylindrical shape of the fiber is represented by dashed lines in FIG. 6. The fundamental mode guidance region associated with core 841 extends from $0 \leq r \leq r_0$ as indicated on the r-axis in graph 14. In fact, graph 14 illustrates the refractive index profile of apparatus 30, according to which core 841 has an average refractive index n from r=0 to r=$r_o$. Theoretically, the value of refractive index within core 841 is preferably constant with radius r and polar angle θ. As the core becomes more elongated, such as elliptical, the radius and the polar angle are no longer constant. This theoretical profile is indicated by a dashed and dotted line A. In practice, because of present day manufacturing processes the refractive index profile in the core exhibits the radial variation visualized by graph 14. For the purposes of the invention it is sufficient, however, that the radially varying index of core 841 has an average value equal to $n_o$. Nominally, the core's average index $n_o$ is about 1.456 for fused silica.

Similarly, the air-clad region 86 has an effective refractive index typically in a range between 1.05 to 1.5 dependent on the core glass material. In this case of fused silica also for the air-clad, the air-clad's effective refractive index would be much less than 1.4 dependent on the size of the air holes, the bigger the hole size, the lower the average air-cladding effective refractive index and the higher the effective numerical aperture (NA).

Core 841 is surrounded by a depressed cladding 16 having a depressed cladding cross-section which is also cylindrically symmetric. Depressed cladding 16 extends from $r_o \leq r \leq r_1$. In turn, depressed cladding 16 is surrounded by a cylindrically secondary cladding as portion of the inner cladding 844. Secondary inner cladding 844 occupies a region extending from $r \geq r_1$.

As is apparent from graph 14, depressed cladding 16 is chosen to have a lower average refractive index $n_1$ than average refractive index no of core 841 and an average refractive index $n_2$ of secondary inner cladding 844. Once again, the average refractive index values are indicated by dashed and dotted line A, while the actual refractive index profile obtained by a typical manufacturing process is indicated by graph 14. The hatched areas in fiber 30 indicate the interface areas where the value of the refractive index transitions between the average values in the core, depressed cladding, and secondary inner cladding regions. The refractive index profile of graph 14, in the fundamental mode guidance region, resembles the letter W (as more clearly seen from the theoretical profile indicated by line A.) Hence, fiber 10 is often referred to as a W-fiber or a fiber with a W-profile. Once again, for the purposes of the invention it is sufficient that the radially varying index have average values of $n_o$ and $n_2$ associated with depressed cladding 16 and secondary inner cladding 844 respectively. It should be noted that the air-clad outer cladding 86 surrounding secondary inner cladding 844 is also present. Such an air-clad outer cladding 86 is used to couple a pump source 72 (as seen in FIG. 1) into the clad-pumped fiber 30 by way of the inner cladding 844 serving as the pump cladding for enabling a hybrid form of clad-pumping.

Figure 2:
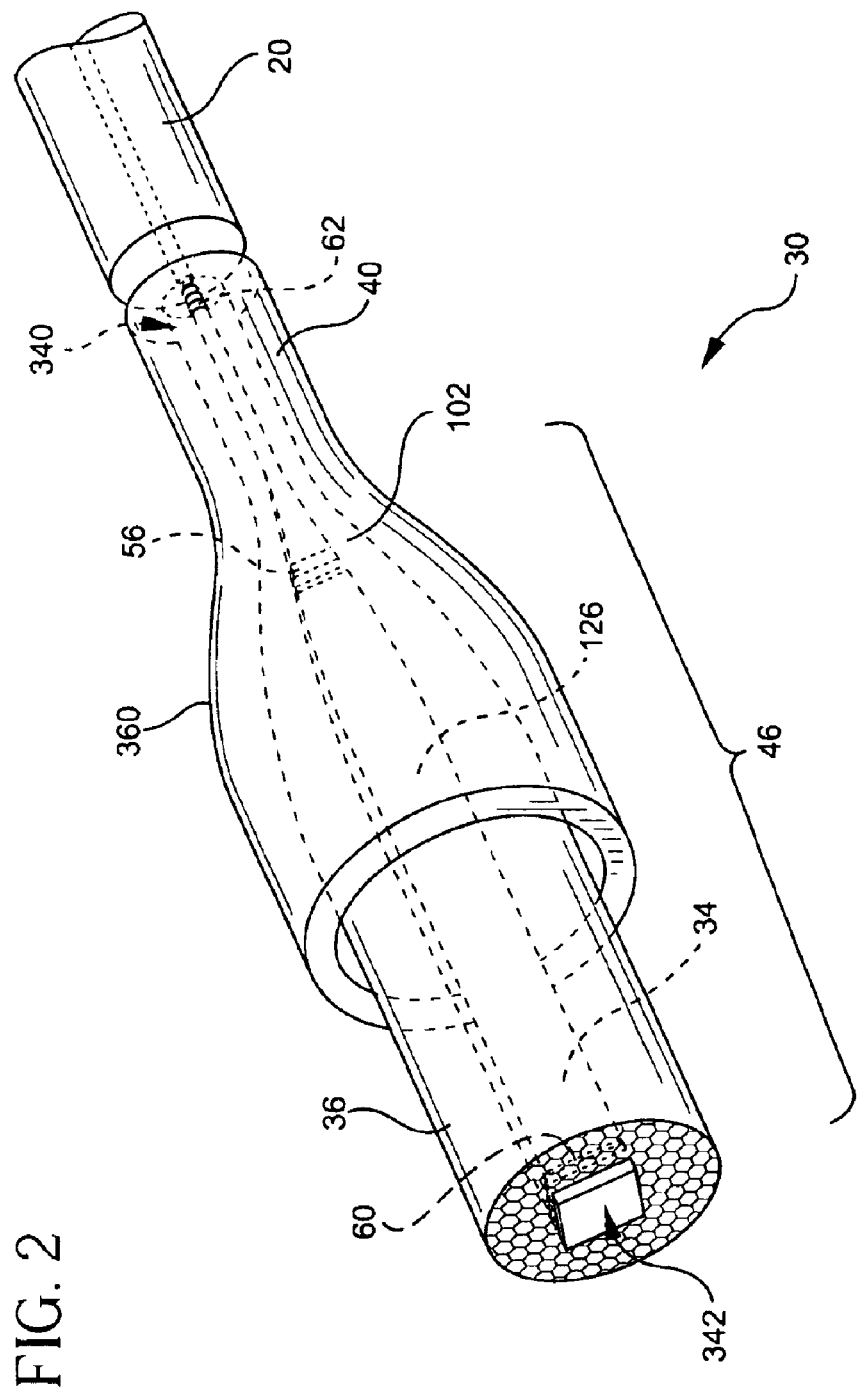
FIG. 2 is a perspective illustration of using the active fiber 30, as a tapered embodiment of a fiber laser, according to the present invention.

The W-profile illustrated in graph 14 is engineered to ensure that light at a first wavelength $\lambda_1$, such as a pump wavelength or a lasing wavelength, propagates in core 841 via total internal reflection (TIR). At the same time, light at a second wavelength $\lambda_2$ longer than $\lambda_1$ ($\lambda_1 < \lambda_2$) is lost or cut off from core 841 at a high loss or attenuation rate. More specifically, the W-profile is engineered to have a fundamental mode cutoff wavelength $\lambda_c$ such that light in the fundamental mode at $\lambda_1$ is retained in core 841 while light in fundamental mode at $\lambda_2$ is lost to secondary inner cladding 844 over a short distance, as indicated by dashed line B. This objective is accomplished by appropriately engineering the W-profile rather than bending fiber 30 or performing other mechanical adjustments, such as tapering as seen in FIG. 2 or represented by the solid line of FIG. 6.

Cutoff wavelength $\lambda_c$ of W-fiber 30 is a wavelength at which the fundamental mode (the $LP_{01}$ mode) abruptly transitions from low-loss to high loss in core 841, i.e., is cut off from core 841. The cutoff wavelength $\lambda_c$ is chosen between wavelength $\lambda_1$ which is desired, and wavelength $\lambda_2$ that is not desired, i.e., $\lambda_1 < \lambda_c < \lambda_2$.

In principle, to determine a cutoff wavelength $\lambda_c$ of a W-fiber, the selection rules for cross-sections and refractive indices $n_o$, $n_1$ and $n_2$ of W-fiber 30 are derived from Maxwell's equations. In the weak guiding approximation (which is valid when the indices of refraction of core 841 and claddings 16, 844 are all relatively close to each other), the Maxwell vector equations can be replaced with a scalar equation. The known scalar $\psi$ represents the strength of the transverse electric field in the fiber and can be used to design an appropriate fiber for the desired cutoff wavelength $\lambda_c$.

In other variations, either the depressed cladding 16 or the inner cladding 844 may not be present or both are not present, as in the tapered case. For example, without a depressed cladding, in one example of FIG. 6, a rare-earth Yb-doped fiber with a rectangular inner cladding 844 made of solid fused silica-based glass and the outer cladding 86 made of holey fused silica material, led to an effective numerical aperture of 0.4 between the inner 844 and outer 86 claddings. A fiber laser built with this fiber, as seen in FIG. 1, delivered 1 W of output power when pumped with a single 915-nm broad-area laser 72.

The rectangular inner cladding 844 can vary in a range from about $33 \times 9$ $\mu m^2$ to $4.8 \times 12$ $mm^2$ (or $4800 \times 12000$ $\mu m^2$) while the core 841 can be elliptical and measure $10 \times 4$ $m^2$. The active dopant was Yb with a concentration of about 0.2 wt % in the core 841. Other rare-earth dopant concentration in the range of about 0.1–5 wt % is also possible. Hence, by increasing the core diameter, adjusting dopant distributions, and varying other fiber design or cavity parameters, an effective multimode core fiber laser can lase a single-mode beam by gain discrimination.

Figure 4:
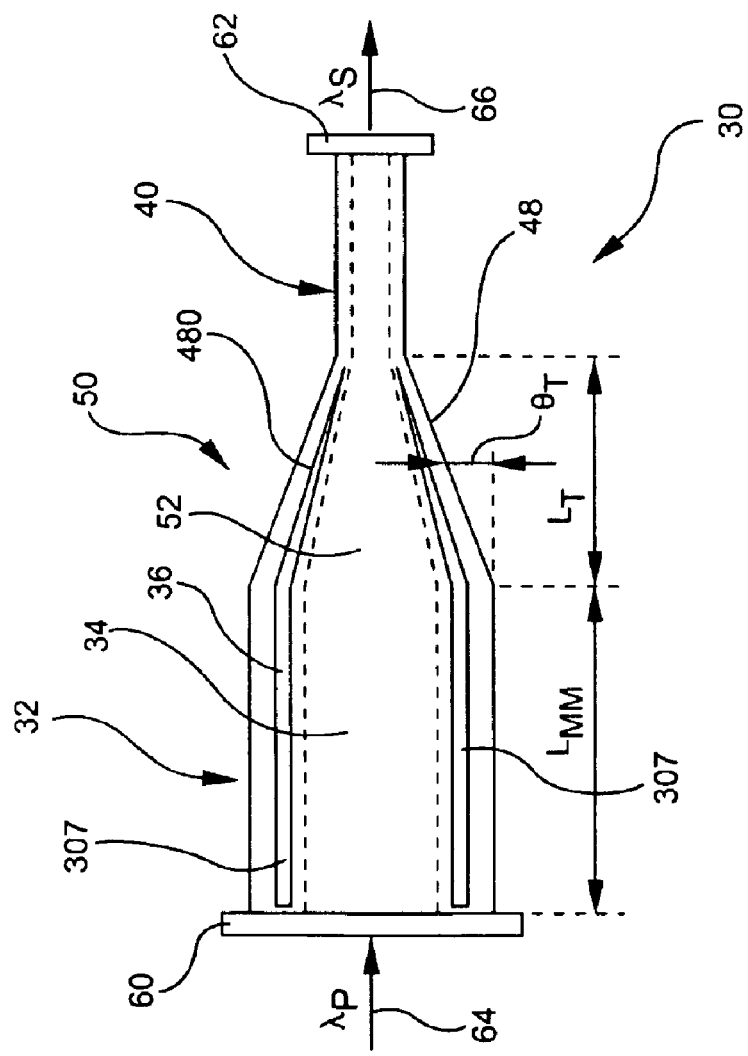
FIG. 4 is a longitudinal cross-section of a tapered fiber laser, such as the one shown in FIG. 2, according to the present invention.
Figure 5:
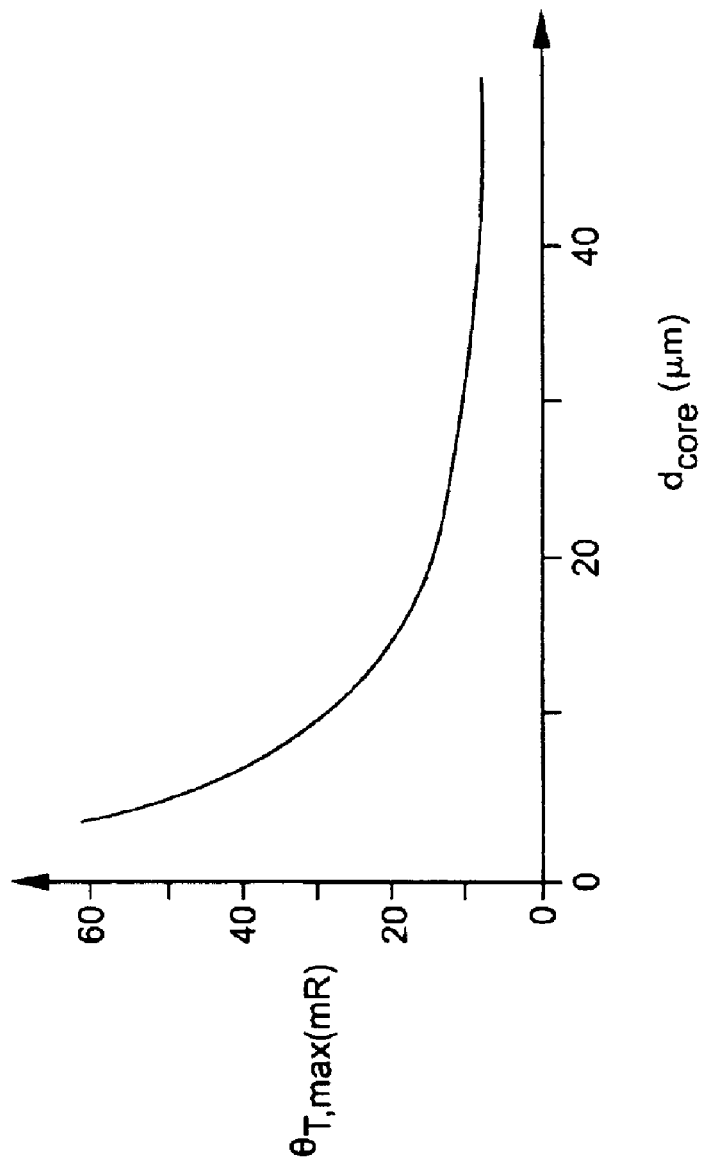
FIG. 5 is a graph of the taper angle as a function of the core dimension for the tapered fiber laser of FIG. 4, according to the present invention.

Referring back to FIG. 6, the fundamental mode guidance region 84 can simply be a transformed solid core wherein the core is tapered, as seen in the solid line and FIGS. 2, and 4, to filter-out higher-order transverse modes and allow only the fundamental to survive for transverse mode selectivity. The tapering thus acts as a mode suppressor in FIGS. 6, 2–5, which is desired to allow an air-clad multimode fiber to lase a single-mode output laser beam.

By using a multimode fiber, the fiber laser that results can scale-up and surpass the conventional power limitation. The power limitation is mainly caused by nonlinear effects, such as stimulated Raman scattering (SRS) and stimulated Brillouin scattering (SBS). The larger effective active area from a multimode fiber raises the threshold for nonlinear processes. Thus a multimode air-clad fiber could generate more powerful and stable laser output than a single-mode air-clad fiber. To force a multimode fiber to operate at single-mode, a mode suppression design is taught by the present invention. These mode suppressing techniques include approaches based on discriminating between the differences of mode gains or losses between the fundamental mode ($LP_{01}$) and higher-order modes (HOMs).

Other examples include increasing the core diameter, adjusting dopant distributions, and varying other fiber design or cavity parameters. A multimode core fiber laser can thus lase a single-mode beam by gain discrimination, as in the effective multimode double-clad examples of FIGS. 7 and 8. Gain discrimination can also be obtained by bending the fiber around a cylindrical mandrel to provide high loss to the HOMs because the $LP_{01}$ mode is the least sensitive to bend loss in the effective multimode double-clad fibers.

As part of the different fiber design parameters, it is known that for any given numerical aperture (NA) of an inner cladding, the longer dimension of a double-clad fiber will be fixed by physics to couple all of the available pump power (since the size of a broad-area laser emitter is fixed and can be demagnified only by the amount defined by the fiber NA relative to the broad-area laser NA). The second or shorter dimension can then be varied. However, if the longer dimension is the same, an elongated shape with an aspect ratio of 3:1 will have a surface area 3 times less than the one with a 1:1 aspect ratio. Therefore, a corresponding laser with such a smaller surface or cladding area can have roughly a three times lowered threshold. Thus, while it is possible to build a 3 level laser with a known D-shaped inner cladding, the inner cladding with an oval or otherwise elongated shape will provide a significantly lower threshold and therefore higher efficiency. Several factors in designing an optimum 3-level double-clad fiber laser relate back to a cladding to core area ratio (CCR). With a given fiber NA and pump laser NA, one of the dimensions of the inner cladding can not be decreased below certain size. But to decrease the surface area as much as possible for higher inversion, in accordance with the teachings of the present invention, the other dimension can be reduced. Thus, it is preferred that neither the area nor an aspect ratio specification by itself is sufficient for building an efficient device and only complying with both specifications at the same time can provide sufficient inversion and low threshold.

Referring to FIG. 1, for further modal gain discrimination, other then using the selectivity of the input and output grating mirrors 60 and 62, the shape and dimensions of the fiber's effective multimode core 84 are chosen from considerations involving maximization of pump power coupling efficiency using anamorphic optics 70. A $200 \times 1$ $\mu m^2$ broad-area laser diode 72 having a near field with NA's of 0.1/0.65 in planes parallel/perpendicular to the junction can be transformed to a nominally $30 \times 10$ $\mu m^2$ spot and coupled with 75% efficiency into an effective multimode air-clad active fiber 30 with a rectangular inner cladding cross section 844 of FIG. 6 having major and minor axes dimensions of $32 \times 16$ $\mu m^2$.

Referring back to FIG. 1, with an upper bound of 4–5 for the cladding to core ratio CCR, the core diameter 42 thus can not be smaller than 10–11 $\mu m$ unless the grating mirror loss at 1015 nm is increased beyond the 22–30 dB range. For every micron reduction in diameter, approximately 8 dB of 1015 nm extra loss is required.

On the other hand, a larger core increases the gain of higher-order modes (HOM) of a compound clad-core structure, which can readily lase, hindering diffraction-limited performance. Preferably, the core cross-sectional area is dimensioned such that the higher-order modes of the air-clad experience a lower overlap with the doped area in the multimode core than the fundamental mode. As the core size increases, the overlapping $\Gamma$ factor of HOM's increases, approaching the value for the fundamental mode, leading to reduced differential modal gain discrimination. Therefore, a 32×16 $\mu m^2$ core having at least one dimension greater than 11 micron in an air clad multimode fiber could be designed to have an estimated near-threshold gain discrimination of approximately 3 dB between the fundamental mode and highest gain HOM.

As part of the multimode fiber section 126, the effective core 84 is doped with an ion optically excitable and having a three-level optical transition when pumped at the pumped end of an optical cavity by the multimode pump source 72 at a pump wavelength for lasing at a signal wavelength different than the pump wavelength at the lasing end of the optical cavity provided by a single-mode fiber section 74. Optionally, the effective core is slightly tapered from the multimode end to the single-mode end such that the optically-active fiber is multimode at the pump wavelength proximate to the multimode end, and is single-mode at the signal wavelength proximate to the single-mode end.

A first multimode grating 60 is written on an input end of the high-NA waveguide portion 126 for defining an input end 28 of the optical cavity. A single-mode grating 62 is written on the low-NA waveguide portion 74 for defining a second end of the optical cavity. An optional second multimode grating 56 is written near the output end 29 of the high-NA waveguide portion 126, either as an integral or a spliced portion, for maximally reflecting power of the spatial modes at most wavelengths of the pump bandwidth propagated in the optical cavity.

These fiber Bragg gratings can be made in separate optical waveguide fibers, such as dummy or un-actively-doped portions 54, 58, and 74, which are spliced together with an intra-cavity Yb doped optical waveguide section 26 to form the pumped cavity or intra-cavity Lyb of the optical cavity in lasing waveguide 30 or could be part of the same unitary, integral, and complete single optical lasing waveguide 26 or spliced variations thereof.

When the core becomes large enough to be multimode, a tapered fiber laser design is another beneficial approach to provide mode suppression. As a mode suppressor, the fiber taper can be designed to have low insertion loss for the fundamental mode $LP_{01}$ and a high insertion loss for higher order modes (HOMs). To satisfy these fiber parameter conditions, the taper angle must be small compared to the numerical aperture of the core. The taper region should also be long enough to enhance mode discriminations because the second order $LP_{11}$ mode may propagate through the fiber taper as leaky modes.

The air-clad may collapse in the taper neck-down region during the tapering or splicing processes, but the collapsed clad has very limited impact on the effective absorption because almost all of the pump light has been absorbed before it reaches the output end. In this case, the collapsed region works as a cut-off filter that strips-off undesired pump light remaining in the air-clad. On the other hand, the collapsed region makes the fiber very easy to write gratings on as well as to splice with another fiber.

Referring to FIG. 2, an example of a laser cavity to convert multimode emission into single-mode with a fiber taper that has low insertion loss for the fundamental mode $LP_{01}$ and high insertion loss for HOMs by choosing an optimum taper angle and taper length is illustrated. This cavity configuration will significantly reduce fiber length as well as increase pump intensity thereby enhancing 3-level lasing.

A high-NA waveguide portion is embodied by a multimode core 34 of FIG. 2 that has a high aspect ratio, such as having a rectangular cross-section 342 of FIG. 3 and FIG. 2. A single-mode output 20 or an optional intervening fiber 74 of FIG. 1 forms the low-NA waveguide portion. Instead of a uniform step-transition between the multimode to single-mode of the mode-selective filter 300 of FIG. 1, this fiber laser uses a slightly sloped or otherwise tapered mode-selective tapered portion 360 to adiabatically transform or otherwise couple the multimode to single-mode.

Since one of the basic differences between a single-mode fiber and a multimode fiber is their core diameter size difference, the mode transformer 300 of FIG. 1 can alternatively be implemented as anything that basically transitions or couples itself from a larger core diameter to a smaller core diameter to match the multimode to single-mode.

In one embodiment of the invention, a rectangular core 34 having an input core cross-section 342, is employed to reduce the active area of the doped core without compromising the coupling efficiency between the pump diode 72 of FIG. 1 and the multimode section 126 to match the elliptically-shaped pump radiation or emission from the diode 72. Other elongated input core cross-sections of other shapes, for example, elliptical or any other matching-beam shape, can be used to match the shape of the pump emission area. However, it is desirable for the output of the fiber laser to have a substantially circular mode field as its output cross-section or core diameter 340. It is desirable for the output of the fiber laser to have a substantially circular mode field because a conventional single-mode fiber 20 has a circular mode field and the better the mode field size and shape match, the lower the coupling loss. Even though the core 34 can be of other shapes, the rectangular aspect is preferred for this fiber laser application because the pump laser diode 72 also has a rectangular beam. In one exemplary way to form the multimode section 126, the rectangular core material 34 is placed within a stacked array of capillary hexagonal tubes to form an air-clad 36 which has a lower effective refractive index than the core's refractive index.

Optionally, whatever is the core's starting shape can be changed into a final rectangular or other elongated shapes by exerting pressure on the core. Thus, the core can be altered with inert gas inserted into the air clad. One can thus control the final shape of the core by the use of vacuum or pressure in the air clad.

For extra stability or for further aspect ratio control, an overclad tube, cane, sleeve, or jacket 360 made of silica, or some other composition such that the overclad has a refractive index the same as the air-clad or lower to control the numerical aperture of the transformed fiber by building up more cladding material around the aperture or reduce the aperture, respectively. An exemplary composition of the optional overclad tube 360 is boron doped silica.

Typically, the core glass 34 is a fused silica or a rare-earth doped fused silica. The high NA results from the lower effective index of the air-glass averaging of indices in the air-clad 36.

It is possible to pump directly into a tapered waveguide. However, the taper angle must be further reduced so that the pump light does not leak out of the tapered waveguide in the neckdown region 102. It is generally preferred to not begin tapering until a significant fraction of the pump light is absorbed and not to taper too much.

A first multimode grating 60 that can be optionally chirped, is written across the rectangular core on an input end of the high-NA waveguide portion 126 for defining an input end of the optical cavity. Another grating 62, multimode, single-mode, or in between, is written across the circular core on the low-NA waveguide portion 40 for defining a second end of the optical cavity. Optionally, the grating 62 can instead be a single-mode grating written across the circular mode of the single-mode fiber 20. A second multimode grating 56 is written on either the high-NA waveguide portion 126 or across the core of the mode-selective tapered portion 102 for maximally reflecting power of the spatial modes at most wavelengths of the pump bandwidth propagated in the optical cavity. Hence, the pump reflector 56 would preferentially be written in the host cavity fiber, inside the mode selective taper, but could also be placed outside the taper and/or be written in a different fiber which is spliced to the cavity fiber.

Instead of using the same dimension for the core 84 of the multimode section as with the single-mode core 20 of FIG. 1, the multimode core in the multimode section 126 can be made much larger. Mode field matching can then be made by using an undoped taper fiber section to connect the larger multimode core 84 to the smaller single-mode core.

The preferred design and dimensions of the air-clad multimode active fiber 30 of FIG. 1 or an active air-clad tapered fiber 30 of FIG. 2, allows strong pump absorption while suppressing long wavelength ASE and allows a strong enough pump intensity to obtain 3-level operation. A multiple-transverse-mode core 34, centrally located within the air-clad 36, is made from glass having the same composition as the air-clad 36 but with the addition of voids to provide the appropriate differences in refractive indexes for dropping the index around the core. Preferably, the core 34 is doped with ytterbium ($Yb^{3+}$), erbium ($Er^{3+}$) or neodymium ($Nd^{3+}$) ions, but other rare-earth ions can be used. The air-clad 36 that is preferably made of a glass with sufficient voids such that $NA_{clad}$ is greater than 0.3. An all-glass design allows these types of refractive indexes and the glass types include lanthanum aluminosilicate glasses, antimony germanates, sulfides, lead bismuth gallates, etc. A preferred material for the overclad 360 is also a glass, for example, an alkali of boroaluminosilicate.

For the ytterbium fiber laser provided by the active fiber 30, the signal wavelength $\lambda_S$ equals about 978 nm corresponding to the three-level $Yb^{3+}$ transition. Although the invention, where it concerns fiber lasers, is developed in view of $Yb^{3+}$ doping, it is not so limited. The fiber laser 30 may be doped with other transitional or rare earth ions, such as $Nd^{3+}$. A combination of $Yb^{3+}$ and $Nd^{3+}$ doping, either by co-doping or by a sequence of differently doped fibers allows pumping at 800 nm rather than 920 nm.

The multimode core serves as a waveguide with a high numerical aperture (NA) for the input pumping light. The cross-section of the multimode core may be designed to have a desired shape, e.g., matched to the near field shape of the pump source 72 of FIG. 1 or any other configuration or shape which increases coupling efficiency of the pump beam. The numerical aperture ($NA_{clad}$) between the core and air-clad must be large enough to capture the output of the pump laser diode 72. The actual increase in brightness realized depends on the clad to core ratio (CCR) of the air-clad to the core area, with the higher the ratio (CCR), the greater the brightness increase. However, this disparity in area between the core and air-clad cross-sections necessitates a long device length, since the absorption of the pump radiation is inversely proportional to this ratio (CCR). Conventionally a high ratio (CCR) of air-clad area to core area renders achieving a high level of inversion difficult which is important for three-level lasing, because in general the higher the ratio (CCR), the lower the level of inversion that can be achieved with a given pump power. Hence, pump absorption and inversion are related.

Using rare-earth ions which require a high level of inversion, such as Er, Yb or Nd as the dopant in the core to provide gain with high clad to core ratio (CCR) is thus problematic. Even with the very high power available from a diode laser bar, it is very difficult to reach the high level of inversion necessary for the operation of a 3-level system for lasers.

The inversion problem stems from the relationship between the gains in the two competing transitions and the pump absorption for Yb. As a representative example, the gains at the two wavelengths in a Yb-doped germano-alumino-silicate glass (assuming homogeneous broadening) are related by the equation:

$$G_{1030} = 0.25 G_{976} + 0.7 \alpha_P \frac{\Gamma_S}{\Gamma_P} \quad (2)$$

where $G_{1030}$ and $G_{976}$ are the gains at 1030 nm and 976 nm, respectively, $\alpha_P$ is the partially-bleached pump absorption in decibels (dB), and $\Gamma_S$ and $\Gamma_P$ are the respective overlap factors of the signal mode and pump mode with the dopant profile. Preferably, the overlap factors $\Gamma_S$ and $\Gamma_P$ of the signal mode and pump mode are such that the overlap ratio $\Gamma_S/\Gamma_P$ is between 0.1 and 10 with a more specific dopant profile $\Gamma_S/\Gamma_P$ between 0.2 and 5.

Similar relationships with different coefficients will hold for other hosts, such as antimony silicate glass. However, in the specific case of an Yb 3-level transition at 980 nm, Equation (2) can be used to estimate the desired overlap ratio of $\Gamma_S$ and $\Gamma_P$ which is closely related to the area ratio (CCR) of the air-clad area over the core area ($A_{clad}/A_{core}$). For Yb, given that an absorption of at least 6 dB of pump is desired, and the inability to suppress more than forty extra dB of gain at the competing quasi-four-level transition at 1030 nm, then using Equation (2), the desired $A_{clad}/A_{core}$ can be calculated. For the preferred silicate host glass the desired clad-to-core ratio ($A_{clad}/A_{core}$) is thus found to be less than eight for an Yb double-clad fiber laser.

Referring back to FIG. 1, the cross-sectional area can be calculated from the dimensions 42 of the core. Preferably, the air clad 86 has an averaged air-clad refractive index ($n_{air-clad}$), less than the core refractive index by at least 0.1, an air-clad cross-sectional area between 2 and 25 times greater than that of the core cross-sectional area (2<CCR<25), and a core aspect ratio greater than 1.5:1. This preferred design and dimensions of the air-clad active fiber 30, allows strong pump absorption, greater than 6 dB, while suppressing long wavelength ASE. The core cross-sectional area can be calculated from the dimensions of the core, which includes a longer dimension 44 that can be exemplified by the longer dimensions of a rectangular or elliptical core.

Neglecting waveguide loss, $g_{976}$=7 dB, it is desired to absorb at least 6 dB of pump power. However, not more than 40 dB of 1040 nm gain can be suppressed by wavelength selective feedback. After substituting these values into Equation (2), the preferred clad-to-core area ratio or overlap ratio of $\Gamma_S/\Gamma_P$ can be found, and a maximum ratio of 7.6 is found for the rare-earth dopant Yb for use in an Yb fiber laser at 980 nm.

For all rare-earth dopants as the optically excitable ions, such as Er, Nd, Tm, and Yb to provide the active medium, especially those requiring a high level of inversion, a maximum allowable core area exists for the double-clad structure.

In general, it is not the clad-to-core ratio (CCR), but the absolute size of the multimode core that is most critical for efficient laser operation or amplification.

Accordingly, the core 34 can be any size that fits inside the air-clad of FIGS. 1–2. However, it is preferable that the core is similar in size and NA to standard single-mode fibers, such as the output fiber 20 or a single-mode interleaving portion 74 of FIG. 1 for coupling to the output fiber 20. With the typical single-mode core radius of 3 to 4 um, a clad-to-core area ratio CCR ($A_{clad}/A_{core}$) of 10:1 to 20:1 is possible. Using a typical core radius of a=3 $\mu$m, the clad-to-core area ratio CCR is $A_{clad}/A_{core}=500/(\pi \cdot 3^2) \approx 18$, which is well below values recommended.

Preferably, the cross-sectional area of the air-clad should not exceed 500 $\mu$m$^2$ for amplification. If the available power is doubled in the laser diode as in a 4 W pump diode, recommended values are then also doubled such that the clad-to-core area ratio range is now 20:1 to 40:1 and the inner cladding area is now less than 1000 $\mu$m$^2$.

What is important for 3-level devices, such as these rare-earth-doped fiber lasers, is the level of pump power density that can be created in the core, which defines the achievable inversion. To find the maximum desired area of the core, it is more convenient to use the power threshold estimate equation for a laser. For any 3-level device the threshold pump power $P_{th}$ in a laser always has to be higher than the saturation power $P_{sat}$. In other words the fiber laser must be "bleached" (i.e., where approximately one-half lasing atoms have been excited into an excited state) along a substantial part of its length. $P_{sat}$ is the saturation power defined as $$P_{sat} = \frac{h\nu}{\sigma_{ap}\tau} A_{core} \qquad (3)$$

Hence, the smaller the core area ($A_{core}$) the lower is the saturation power $P_{sat}$ because these two terms are directly related by Equation (3). The smaller the saturation power is, the greater the inversion because these terms are inversely related, hence the higher inversion can be achieved to make a 3-level laser work.

The threshold power $P_t$ scales in proportion to the core area ($A_{core}$) and the length of the laser. The threshold pump power is well approximated by the following equation where it can be seen that the threshold pump power is higher than the saturation power by a factor ($\alpha_p/4.343$) when the fiber laser is bleached:

$$P_{th} = P_{sat}(\alpha_P/4.343) = \frac{h\nu A_{core}}{\sigma_{ap}\tau}(\alpha_P/4.343) \qquad (4)$$

where $\sigma^a$ is the pump absorption cross section, $\tau$ is the fluorescent or metastable level lifetime, $A_{core}$ is the cross-sectional area of the core, and $\alpha_P$ is the pump absorption in dB. Hence, from Equation (4), the power threshold for lasing depends essentially on the dimensions of the core and the background loss in the active fiber over the pump absorption length.

Referring to FIG. 1, if the Yb fiber laser provided by the active fiber 30 is pumped with a single 2 W broad-area laser diode 72 and the input pump power $P_{in}=1600$ mW is actually launched in the core 84, for efficient laser operation the threshold power required for lasing should not exceed about a quarter of the input pump power, or 400 mW. Taking $\alpha_p=6$ dB, h$\nu=2.16 \times 10^{-19}$ J (for a 920 nm pump), $\sigma_{ap}=8.3 \times 10^{-21}$ m$^2$, $\tau=0.8$ ms and P maximum core area is preferably $A_{core}=890$ $\mu$m$^2$ from Equation (4). Hence, for a Yb doped 976 nm air-clad multimode or tapered fiber laser pumped with a 920 nm broad-area laser diode, the recommended values for clad-to-core area ratio are 2:1 to 8:1 from Equation (2) and the cross-sectional area of the core should not exceed 900 $\mu$m$^2$ from Equation (4) because the threshold should be decreased as much as possible.

Preferably, the core cross-sectional area and the air-clad cross-sectional area are optimized such that the air-clad cross-sectional area proximate the first end is between 2 and 8 times greater than that of the core cross-sectional area proximate the second end, and the air-clad has an aspect ratio greater than 1.5:1 proximate the first end.

However, the practical size of the minimum area of the core will be limited by the choice of materials (NA$_{clad}$ and the index contrast or index delta) and the quality of pump focusing optics 70. With a core aspect ratio of 2 or higher it would be impossible to have a cladding to core area ratio CCR of less than 2. Furthermore, with conventional optics it is very difficult to focus a greater than 100 um broad area laser into a spot smaller than 20 um in size, and it is not practical to make a single-mode core larger than 10 um because the required index contrast or index delta will be too low. This, again, dictates that the minimum CCR is about two.

In general, maximizing the overlap between pumping light and actively-doped fiber core is advantageous. Thus it is desirable to make the core larger and the air-clad smaller. A larger core improves pump absorption and a smaller air-clad helps create higher inversion with less pump power.

The example easiest to follow is one using the Yb fiber laser at 980 nm. Due to physics, an area ratio (CCR) of not more than 5 or 6 is needed. Given the current material choice and capabilities of coupling optics 70, there is a limit to which the cladding size can be decreased before the pump coupling efficiency will start to suffer. Given that minimum cladding size, the only way to decrease the clad to core area ratio (CCR) below 5 or 6 is to start making the core larger and larger.

As discussed, many factors affect the optimum design of a waveguiding structure. The number of modes and their intensity (field) distribution within the waveguide depend on the waveguide shape, index contrast or index delta $\Delta$, and size.

A similar definition can be given for the standard case, when the core and the air-clad have a clear border, because once again, the pump uses many modes of the cladding and the signal only uses one mode of the core. However, for the standard case this definition would give almost exactly the same numerical value as the physical cross-sectional ratio (CCR).

Optically, for conserving "etendue", the product of the NA$_{core}$ and spot size of the active multimode or tapered air-clad fiber 30 has to be equal or greater than the product of the numerical aperture (NA$_{laser}$) and the spot size on the laser diode 72 of FIG. 1. If optics 70 is used to de-magnify the image of the laser emitting area, the same optics 70 will automatically make a beam more divergent, or increase its NA. The core (serving as a pump waveguide) NA, NA$_{core}$ must then be equal or higher than that of the incoming beam, to collect all of the light. The general definition for the NA refers to the maximum divergence angle at which a light beam can enter a waveguide and still experience total internal reflection needed for waveguiding. For a typical 100 $\mu$m broad stripe laser, the divergence angle parallel to the stripe (slow axis) corresponds to an NA of approximately 0.1. A fiber NA greater than 0.35 is then desired for the efficient coupling of the pump light into a 30 $\mu$m core. For a 15 $\mu$m core, an NA of 0.7 is needed.

The NA of the fiber waveguide also relates to the minimum air-clad size and to the threshold power value for a particular aspect ratio. In general, the higher the fiber NA, the lower the threshold power required. Relatively, the threshold power required for a square air-clad having a value of unity for the aspect ratio (AR) of the height to the width is the highest. The next highest threshold is for a circular air-clad. As the aspect ratio of the rectangular multimode core drops, the threshold power for lasing is significantly decreased. For rectangular aspect ratios of more than $4/\pi$ or 1.27, the rectangular core has a smaller threshold power for lasing than a circular one. For example, for a waveguide with a numerical aperture of 0.6, the threshold power for lasing is reduced from 900 mW for a circular core of a 33 $\mu$m diameter fiber to 200 mW for a rectangular core of the fiber waveguide having an aspect ratio of 3 (33 $\mu$m/11 $\mu$m). These dimensions are consistent with image sizes of broad stripe diode lasers. This reduction in threshold power for lasing is greatly advantageous if a 2 W diode is the limit of commonly available broad stripe pump sources.

As is known, for efficient coupling of the pump light, the core geometry should match the geometry of the pumping diode. Unfortunately, the light emitting spot of a broad-area semiconductor laser is strongly asymmetric, with an aspect ratio of at least 100:1. The beam is typically single-mode (Gaussian) in the fast axis direction (perpendicular to the wafer plane) and strongly multimode in the slow axis direction (parallel to the wafer plane). The slow axis direction is the most critical one, ultimately defining the allowable size of the pump waveguide or fiber laser.

Referring to FIG. 3, the present invention teaches a variety of elongated shapes that can be used for the core of FIG. 1 or 2, the most technologically convenient one being the rectangular inner cladding 342. Even though the air-clad 36 is shown with hole sizes relatively small compared to the transformed core 34, the individual hole radius can be much, much larger and fewer than the holes 55 shown in FIG. 6. As already stated, the holes need not also be uniform. The longer (slow axis) dimension should be at least 10–20% larger than the width of the diode laser aperture times the ratio of the diode slow axis $NA_{laser}$ to the fiber NA. For example, if a 100 $\mu$m diode laser with 0.1 NA is used for pumping and the fiber core NA is 0.3, then the longer dimension of that core should be at least 1.2·100/3=40 $\mu$m. To keep the cross-sectional area of the core as small as possible, the shorter (fast axis) core dimension should be made just large enough to accommodate a single-mode. Resulting aspect ratio of the cladding will then be 1.5:1 or higher. Oblong or an otherwise elongated shape of the core combined with the relatively small clad-to-core area ratio (CCR), will ensure uniform pump absorption by equalizing pump modes overlap with the doped core.

No attempt has been made to accurately illustrate the relative diameters, number, or pattern of the air-clad voids or of the core in the cross-sectional area representations of the active fiber 30 in FIGS. 1–3. However, the area of the core is preferably approximately less than twenty-five times larger than the area of the core.

Air (n=1) is used as part of the index material for the air-clad and is encapsulated by the capillary tubes 307. The cladding index is changed as a function of air known as an air or void filling fraction $f$ which is related to the average hole-size ($r_{cl}$) 5 of non-uniform holes of the lattice as follows:

$$f = \frac{\pi}{2\sqrt{3}}\left(\frac{d}{\Lambda}\right)^2 = \frac{2\pi}{\sqrt{3}}\left(\frac{r_{cl}}{\Lambda}\right)^2 \qquad (5)$$

Hence, the air-clad has an average pitch ($\Lambda$) 4 which need not be the same for all the spacing between adjacent voids, channels, holes, capillaries, or apertures with size that can all be periodic or non-periodic with the same radius or an average radius for non-uniform holes of varying shapes having an averaged radius $r_{cl}$ such that a ratio of $r_{cl}/\Lambda\Lambda$ is in an optimum range about $0.35 \leq r_{cl}/\Lambda \leq 0.5$ for providing an air filling fraction from about 0.44 to 0.91. The upper bound of 0.91 is the air filling fraction when the lattice can no longer support circular voids. As the voids become less rounded, the air-filling fraction can approach the limit of 1.

Hence, in general it is preferred that the air filled fraction of the air-clad (excluding the core) would be greater than 0.7 to provide a high numerical aperture above 0.45. FIG. 3 illustrates an active multimode air-clad fiber 30 with an air filled fraction of 73.7% (0.737). Actual fibers with such an air filled fraction ideal would vary in the range of between 0.7 and 0.74, with an average of 0.72 due to non-uniformity of the fiber profile. This void-filling fraction calculation can be done by scanning a picture of the end of the microstructure fiber, digitizing the scanned figure and, excluding the core area, and then measuring the ratio of the area occupied by the pores, gas, or air to the area of the matrix, web, or capillary walls.

Because the finished product may not be as symmetrical as the starting material, the fraction of the finished sample could be approximated. If the finished sample had near-circular holes, the fraction can be calculated by measuring the dimensions of the cylinders (both inner and outer diameters), measuring the pitch between the cylinders and calculating the air-filled fraction from these numbers.

Preferably, the air-clad has an approximate hexagonal void array having circular holes in each of a hexagonal starting capillary tube 307 for ease of stacking and ability to etch out more material to enlarge the circular holes to provide a high numerical aperture above 0.45. As an example, the hexagonal starting capillary tube has a flat-to-flat dimension 6 of about 1.5 mm.

Referring back to FIGS. 1–2, the length 46 of the active fiber 30 is relatively unimportant beyond it being very long compared to the wavelengths involved so that any higher-order modes are adequately attenuated over its length. In practice, this length 46 is determined by the level of rare earth doping in the core and desired pump absorption efficiency. In some circumstances 1 cm in length is more than adequate.

Cylindrical fibers are only one example of dielectric waveguides that can be used as a tapered fiber laser. Fibers can be drawn into other shapes, for example, ellipses or rectangles.

Referring to the cross-sectional view of FIG. 4, the input side includes a length $L_{MM}$ of doped multimode fiber section 32, preferably for our stated purposes doped with ytterbium ions ($Yb^{3+}$). The multimode fiber section 32 includes the core 34 and the air-clad 36. No attempt has been made to accurately illustrate their relative diameters. The output side includes a length of single-mode fiber section 40, also composed of the core 90 and the cladding 92. The single-mode length is relatively unimportant beyond it being very long compared to the wavelengths involved so that any higher-order modes are adequately attenuated over its length. In most circumstances 1 cm of single-mode length is more than adequate. The multimode section 32 is joined to the single-mode section 40 through an adiabatically tapered section 48 composed of a core 52 and a tapered cladding 480. This tapered section can be doped with the optically-active ion or undoped as a separate tapered fiber section or a tapered coupler. The tapered cladding 480 can be an air-clad type of cladding similar to the air-clad 36 or simply use air (n=1) as the cladding without any structure. The tapered section 48 has a length $L_T$, but a more relevant parameter is a taper angle $\theta_T$ which is of the order of tens of milliradians (½°), as will be discussed later with respect to FIG. 5.

As is well known, if a fiber is below a certain diameter it can support only a single transverse mode. Above that diameter, two or more transverse modes are supported. The larger the diameter, the larger the number of modes. For a simple optical fiber having a core of refractive index $n_{core}$ and having a thick cladding of refractive index $n_{clad}$, the maximum core diameter $d_{SM}$ supporting only a single-mode is given by the equation:

$$d_{SM} = \frac{2.405\lambda}{\pi\sqrt{n_{core}^2 - n_{clad}^2}} \quad (6)$$

The relevant wavelength λ is that of the lasing light, which is 976 nm for a $Yb^{3+}$-doped fiber. Optical fibers of other designs have more complicated cross sections including additional layers at the core-cladding transition or a continuously graded refractive index across the transition. Numerical solutions for the maximum single-mode diameter are available for some of these. For others, whether the fiber supports one or more transverse modes at a particular wavelength can be determined experimentally.

The tapered fiber laser using the fiber 30 includes two mirrors 60, 62 defining the input and output ends respectively of the optical cavity. The multimode section 32, the tapered section 50, and the single-mode section 40 are all included within the optical cavity. The input mirror 60 is made highly transmissive to an optical pump signal 64 at the pump wavelength $\lambda_P$ and highly reflective at the signal (lasing) wavelength $\lambda_P$ of the output signal 66 while the output mirror 62 is made partially reflective (partially transmissive) at the signal wavelength $\lambda_S$. For fiber lasers, it is possible to use a cleaved output facet as the output mirror. Even its 4% reflectance across an air gap to a butt coupled output fiber 20 of FIG. 1 is sufficient to define the optical cavity. Thereby, the pump signal 64 is efficiently admitted into the optical cavity at the input mirror 60, an optical cavity is defined between the mirrors 60, 62, and some of the standing wave in the optical cavity is allowed to pass through the output mirror 62.

Although interference filters can be used as one or both of the end mirrors 60, 62, Bragg grating reflectors are conventionally written directly onto fibers by UV patterning. If the single-mode section 40 is fusion spliced to the output fiber 20, a low-reflectivity grating or a 4% reflection from a downstream pigtail can provide feedback. Laser efficiency is relatively insensitive to output coupling unless the cavity has high loss. It is further possible to discriminate against the 1030 nm mode by making one of the end reflectors preferentially transmissive to 1030 nm, but such discrimination is not necessary if the fiber length is limited so that insufficient gain exists for lasing at 1030 nm and longer The tapered section 50 acts as a cutoff filter passing the lowest-order mode but blocking any higher-order mode. It is important that the taper angle $\theta_T$ be kept small enough that the lowest-order mode passes through the taper without being mixed into other modes as the mode size shrinks from the size of the multimode fiber to the size of the single-mode fiber. This condition is called adiabatic coupling. Thereby, only the fundamental mode is coupled into the single-mode section with minimum loss of power. Also importantly, adequate lowest-order feedback from the output mirror 62 back into the multimode section 32 causes the multimode section 32 to lase only in the fundamental mode, thus greatly conserving power.

Tapered optical fibers have previously been proposed to expand the mode field diameter coming from a single-mode fiber. That is, up-tapered fibers are known. These devices have been shown to operate with low loss, that is, with negligible coupling to higher-order modes up to spot sizes of 50 μm. The V-value at this spot size is approximately 30 for a typical 0.2 NA (numerical aperture) fiber, and this V-value corresponds to about 500 guided modes supported in the multimode fiber. The limiting factor is mode coupling between the $LP_{01}$ mode and the $LP_{02}$ mode. This coupling can be kept to negligible values provided that the local taper angle $\theta_T(Z)$ be kept to $$\theta_T(z) < \theta_{T,\max} = \frac{2\pi a(z)}{\beta_{01} - \beta_{02}} \quad (7)$$

where $\beta_{01}$ and $\beta_{02}$ are the propagation constants of the $LP_{01}$ and $LP_{02}$ modes and a(z) is the local core radius. The propagation constants vary strongly with the core radius resulting in the limiting taper angle $\theta_{T,max}$ in milliradians plotted as a function of core diameter $d_{core}$ in FIG. 5 for a 0.6 NA fiber. Clearly, the condition becomes stricter as the fiber diameter increases, but even at 50 μm, it is still 3.8 mR (0.218 degree). The worst condition occurs for the core diameter of the multimode section. A constant taper over as short a length $L_T$ as 5 mm will show negligible loss to other modes. A parabolic rather than linear taper produces the shortest adiabatic length.

Minute imperfections in the multimode fiber will cause some mode mixing from the fundamental to the higher-order modes. This type of mode mixing can be reduced by heavily doping the fiber with either $Yb^{3+}$ or neodymium ($Nd^{3+}$). In highly doped fibers, $L_{abs} \ll L_{max}$, where $L_{abs}$ is the absorption length (inverse to doping concentration) and $L_{max}$ is the length corresponding to significant mode coupling due to the minute imperfections, the doping or fiber length is chosen such that absorption length nearly equals or is somewhat less than the length of the multimode fiber, $L_{abs} < L_{MM}$. If the multimode fiber were substantially longer, $L_{MM} \gg L_{abs}$, lasing at 1030 nm would be favored, as was previously discussed. A length of no more than several centimeters is possible. An absorption of 15 dB in the multimode fiber means that a large fraction of the pump power is absorbed. This amount of absorption corresponds to about five absorption lengths, that is, $L_{MM} < 5L_{abs}$. In practice, we may use a length $L_{MM}$ shorter than $5L_{abs}$ to trade off unabsorbed pump power against threshold.

The illustration implies that the three sections 32, 480, 40 are drawn from a common doped preform. However, different fibers, such as a single-mode air-clad, single-mode photonic band gap, other microstructure fibers, conventional single-mode, etc. may be spliced together to form the illustrated structure. Because the pump light is mostly absorbed in the multimode section 32, only that section needs to be doped to absorb the pump light and provide the excitable states. Indeed, even the multimode section 32 can be divided into a doped and an undoped section that again can be divided into an air-clad, photonic band gap, other microstructures or a conventional single-mode fiber section. For example, if the hollow core of a photonic band gap multimode fiber was used as part of the multimode section, the core would interact with the dopants and facilitate doping, if an interface area around the core that is located in the photonic band gap cladding area were to be disposed with the optically-active ions.

The most likely loss of the lowest-order mode is caused by coupling into higher-order modes at the end of the multimode section 32 next to the input mirror 60 as a result of an imperfect end face angle. For a 50 μm spot size, roughly the core diameter, a tolerance of ±0.23 degree is required to achieve less than 1 dB loss from the lowest-order mode. This tolerance is obtainable by careful cleaving or polishing.

This design allows the major part of the optical gain to be obtained in the wide multimode section 32, particularly when the multimode length $L_{MM}$ is made longer than the absorption length $L_{abs}$ at the pump wavelength $\lambda_P$, that is, longer than $1/\alpha_P$. However, the output of the tapered fiber laser is a single, fundamental mode.

It will be apparent to those skilled in the art that various modifications and variations to the options and design criteria of the inventive transformed fiber that could be embodied as a tapered, stepped-up, coupled or other types of fiber without departing from the spirit and scope of the invention. Thus, it is intended that the present invention covers the modifications and variations of this invention provided they come within the scope of the appended claims and their equivalents.

What is claimed is:

1. An air-clad fiber optic structure comprising:
    a guidance region having an actively doped gain portion, wherein the guidance region comprises:
        a solid silica core wherein the solid silica core has an oscillation suppression portion to suppress oscillation in transitions that can be inverted with lower gain at longer wavelengths to provide a fundamental mode cut-off wavelength region, wherein the wavelength point at which transmission of the fundamental mode is in a range at least 3–10 dB below maximum; and
        a solid silica inner-cladding surrounding the solid silica core; and
    an air-clad region surrounding the guidance region, the air-clad region having an area ratio of solid wall to air of less than about 0.3 to provide a lower effective refractive index than the refractive index of the guidance region for the actively doped gain portion.

2. The structure of claim 1, wherein the oscillation suppression portion comprises a depressed cladding portion wherein losses are added in transitions that can be inverted with lower gain at longer wavelengths.

3. The structure of claim 2, wherein the core is single-mode.

4. The structure of claim 2, wherein the core is multimode.

5. The structure of claim 1, wherein the guidance region comprises a transformed solid core wherein the core is tapered to filter-out higher-order transverse modes and allow only the fundamental to survive for transverse mode selectivity.

6. The structure of claim 5, wherein the transformed solid core comprises:
    a core facilitating doping with an ion optically excitable and having a three-level optical transition when pumped at a first end of an optical cavity by a multimode pump source at a pump wavelength for lasing at a signal wavelength different than the pump wavelength at a second end of the optical cavity, the core having a refractive index, wherein the core is transformed from the first end to proximate the second end thereof such that the core is multimode at the pump wavelength proximate to the first end, and is single-mode at the signal wavelength proximate to the second end.

7. The structure of claim 6, wherein the core comprises:
    a multimode core portion surrounded by the air-clad region to form a larger numerical aperture (NA) multimode portion; and
    a single-mode core portion for coupling at the input with the output of the multimode portion.

8. The structure of claim 6, wherein the core is adiabatically tapered between the first end and the second end thereof to prevent mixing of a lowest-order mode of the core with one or more higher-order modes thereof.

9. The structure of claim 6 wherein the ion is selected from a group consisting of ytterbium or neodymium for producing a three-level lasing system for use as a tapered 3-level fiber laser.

10. The structure of claim 6, wherein the core comprises a doped multimode elongated core cross-section proximate to the first end.

11. The structure of claim 6, wherein the core comprises a doped multimode elliptical core cross-section proximate to the first end formed from applied pressure in the air-clad region for changing an original core shape to the desired elliptical cross-section.

12. The structure of claim 1, wherein the air-clad region has a void-filling fraction of at least 70% to provide a high numerical aperture above 0.45.

13. The structure of claim 1, wherein the air-clad region has an approximate hexagonal void array having circular holes in each of a hexagonal starting capillary tube to provide a high numerical aperture above 0.45.

14. The structure of claim 6, wherein the core comprises:
    a first active-doped waveguide portion optically pumped at the pump wavelength of a pump bandwidth from an optical source for lasing with an emission at the signal wavelength, wherein the first waveguide portion having a multimode core proximate the air-clad region such that the multimode core exhibits multi-transverse-mode behavior at the signal wavelength and at the pump wavelength;
    a second waveguide portion exhibiting a substantially single transverse mode behavior at the signal wavelength optically coupled with the first waveguide portion;
    a mode-selective tapered portion optically coupled in between the first and second waveguide portions for selecting the substantially single transverse mode from the multi-transverse-modes;
    a first multimode grating written on the first end of the first waveguide portion for defining an input end of an optical cavity;
    a single-mode grating written on the second waveguide portion for defining a second end of the optical cavity; and
    a second multimode grating written on the first waveguide portion proximate the second end for maximally reflecting power of the spatial modes at most wavelengths of the pump bandwidth propagated in the optical cavity.

15. The structure of claim 14, wherein the first and second multimode gratings are each written on a pair of multimode un-doped dummy portions spliced to the first waveguide portion for forming a pumped cavity within the optical cavity.

16. The structure of claim 1, wherein the core having a core cross-sectional area and the air-clad region having an air-clad cross-sectional area such that the air-clad cross-sectional area proximate the first end is between 2 and 8 times greater than that of the core cross-sectional area proximate the second end, and the air-clad region has an aspect ratio greater than 1.5:1 proximate the first end.

17. An optically-active air-clad fiber comprising:

a core doped with an ion optically excitable and having an optical transition at a signal wavelength, the core having a refractive index, wherein the core is tapered from a first end to a second end thereof such that the optically active fiber is multimode at the signal wavelength proximate to the first end, is single-mode at the signal wavelength proximate to the second end, and has overlap factors $\Gamma_S$ and $\Gamma_P$ of the signal mode and pump mode such that the overlap ratio $\Gamma_S/\Gamma_P$ is between 0.1 and 10; and an air-clad surrounding the core and having a lower effective refractive index than the refractive index of the core.

18. An optically-active air-clad fiber comprising:

a core doped with an ion optically excitable and having an optical transition at a signal wavelength, the core having a refractive index, wherein the core is tapered from a first end to a second end thereof such that the optically-active air-clad fiber is multimode at the signal wavelength proximate to the first end, is single-mode at the signal wavelength proximate to the second end, and has overlap factors $\Gamma_S$ and $\Gamma_P$ of the signal mode and pump mode with a dopant profile such that the overlap ratio $\Gamma_S/\Gamma_P$ is between 0.2 and 5; and an air-clad surrounding the core and having a lower effective refractive index than the refractive index of the core.

19. The optically-active air-clad fiber of claim 18, wherein the air-clad has an area ratio of solid wall to air of less than about 0.3.

* * * * *